United States Patent [19]

Vandermeerssche

[11] Patent Number: 4,529,184

[45] Date of Patent: Jul. 16, 1985

[54] TEST SPECIMEN HOLDER

[75] Inventor: Gaston A. Vandermeerssche, 9240 N. Sleepy Hollow La., Milwaukee, Wis. 53217

[73] Assignee: Gaston A. Vandermeerssche, Milwaukee, Wis.

[21] Appl. No.: 456,577

[22] Filed: Jan. 7, 1983

[51] Int. Cl.³ .............................................. B23B 31/40
[52] U.S. Cl. ...................................... 269/48.1; 73/856
[58] Field of Search ............... 269/48.1, 52; 279/2 R; 294/93, 94, 96; 73/856, 859; 53/247, 539

[56] References Cited

U.S. PATENT DOCUMENTS

| | | | |
|---|---|---|---|
| 2,219,124 | 10/1940 | Bandy | 279/2 R X |
| 2,226,078 | 12/1940 | Spahn | 269/48.1 X |
| 2,767,676 | 10/1956 | Johnson et al. | 269/48.1 |
| 3,701,537 | 10/1972 | Rossman et al. | 279/2 R X |
| 3,780,492 | 12/1973 | Corderoy | 294/93 X |
| 3,829,147 | 8/1974 | Ryswick | 294/93 |
| 3,909,021 | 9/1975 | Morawski et al. | 279/2 R |
| 3,977,687 | 8/1976 | Manganelli | 269/48.1 X |
| 4,368,996 | 1/1983 | Davis et al. | 269/48.1 X |

FOREIGN PATENT DOCUMENTS

| | | | |
|---|---|---|---|
| 354417 | 11/1937 | Italy | 279/2 R |
| 13274 | of 1915 | United Kingdom | 279/2 R |

*Primary Examiner*—Frederick R. Schmidt
*Assistant Examiner*—Steven P. Schad
*Attorney, Agent, or Firm*—Quarles & Brady

[57] ABSTRACT

A holder is shown for empty beverage cans which are to be tested for the abrasion resistance of coatings on the cans. In one embodiment, the holder is formed with an elastomer shell which is received in an empty can. An expander is inserted in a longitudinal opening in the shell and is rotated to engage cam surfaces on both the shell and holder thereby expanding the shell into contact with the empty can. The pressure exerted by the expanded shell simulates that of the contents of a beverage can. In a second embodiment the elastomer shell has a conical opening which receives a similarly conically shaped expander which expands the shell in all directions as it is forced longitudinally into the shell. A strap holds three cans and their holders together by engaging projections into shaped recesses in the tops of the expanders.

3 Claims, 5 Drawing Figures

# TEST SPECIMEN HOLDER

BACKGROUND OF THE INVENTION

This invention relates to the testing of cans, and more particularly to a holder for test specimens.

In my co-pending application Ser. No. 06/411,673 filed Aug. 26, 1982 for "Abrasion Testing Machine", I have disclosed a machine for testing the abrasion resistance of coatings used on cans. The preferred form of the machine is capable of accepting a six-pack of cans and to subject the cans to forces and vibrations which simulate those which would be encountered during shipment. The surfaces of adjacent cans in contact rub against each other as a result of the vibrations. The testing equipment is particularly useful in testing beverage cans or other cans in which the contents are under pressure.

In addition to testing filled cans, the testing machine can also be used to test empty cans as the cans leave a can production line. When empty cans are tested, they do not by themselves have sufficient dimensional stability and the pressure of the contents is not present. Thus, it is not possible to accurately translate the test results into that which would be experienced by filled cans.

The present invention is directed to a holder for empty cans which will simulate the conditions of filled cans and will also simulate the condition of a six-pack carrier of filled cans. The holder can also be used with other similar cylindrical test specimens.

SUMMARY OF THE INVENTION

In accordance with one aspect of the invention, I provide a test specimen holder which includes a circular cylindrical shell of resilient material adapted for insertion into a circular cylindrical test specimen, the shell having an axially extending opening at its center, and an expander disposed in the opening and adapted to be moved relative to the shell to expand the shell into engagement with the inside of the test specimen.

In accordance with another aspect of the invention, I provide a plurality of such holders joined together in a line by a strip having a projection for each holder which engages a complementary recess in the expander of each holder.

In one of the embodiments, the opening in the shell has at least one cam surface extending along its length, and the expander is provided with a complementary cam surface such that when the expander is rotated the cam surfaces are engaged and the shell is forced to expand outwardly. In another embodiment the expander is conical and the opening is likewise conical such that the shell is forced to expand as the conical expander is moved axially into the shell.

It is a principal object of the invention to provide a holder for the abrasion testing of empty cans.

It is another object to provide such a holder which can simulate the effects of a filled can.

It is still another object of the invention to provide such a holder which can be reused and which can be quickly and easily assembled within the empty can.

The foregoing and other objects and advantages of the invention will appear in the following detailed description. In the description, reference is made to the accompanying drawings which form a part hereof and which disclose preferred embodiments of the invention.

DETAILED DESCRIPTION OF THE PREFERRED EMBODIMENTS

Figure 1:
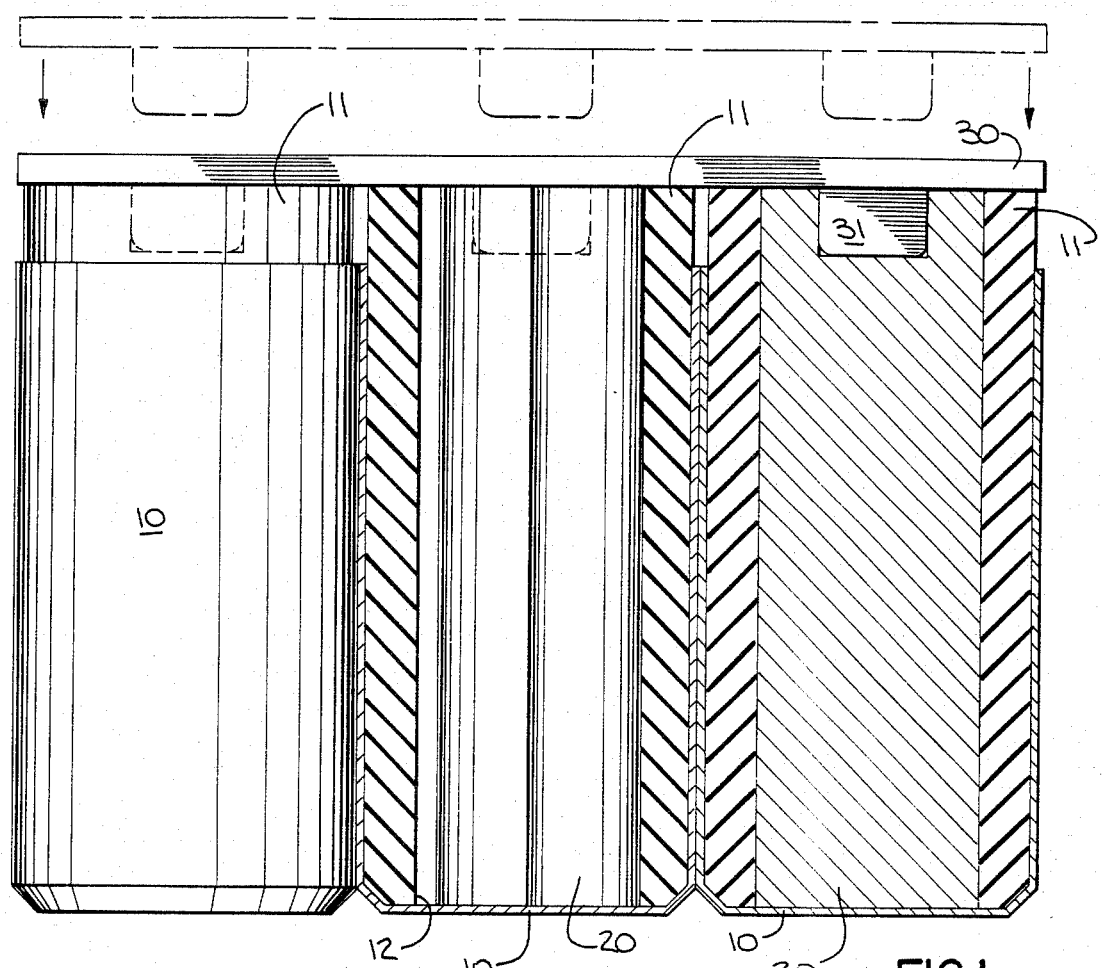
FIG. 1 is a view in elevation and partially in section of three empty cans with three identical can holders in place and joined together.
Figure 2:
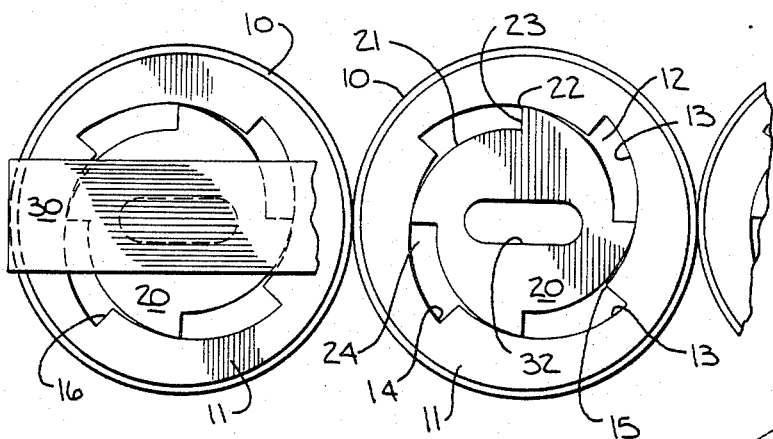
FIG. 2 is a top view of the cans and can holders of FIG. 1 with portions broken away for clarity.
Figure 3:
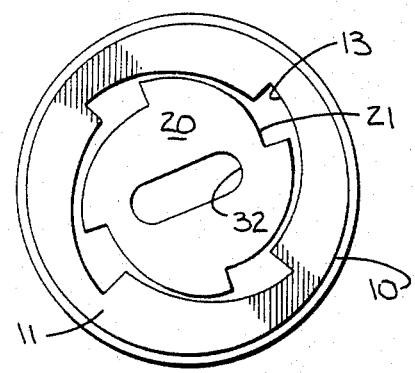
FIG. 3 is a top plan view of a holder of FIGS. 1 and 2 in a relaxed state.

Referring to FIGS. 1-3, the test specimen holder is adapted to be used with an empty beverage can specimen 10 which is typically formed of steel or aluminum from a one piece blank which is drawn into a shape as shown in FIG. 1. The specimens 10 are to be tested prior to being filled or having the top can lid placed upon them. In the first embodiment, a circular cylindrical shell 11 is formed of a material having flexibility to the degree that it can simulate the pressure exerted on a filled can by its contents under pressure. A satisfactory material for the shell 11 is a polyurethane, although other natural and synthetic elastomers would be usable. At a durometer hardness of between 40 A and 80 A, preferrably about 60 A, such material will closely simulate the resistance of contents under pressure in a beverage can. The shell 11 is formed with an outer diameter which is less than the inner diameter of the specimens 10 so that a clearance of about 1 mm is allowed in all directions when the shell 11 is in a relaxed state.

The shell 11 has a central opening 12 extending throughout its length. The opening 12 is formed with a series of side walls 13 which provide cam surfaces. That is, the curved side walls 13 are not concentric with the axis of the shell 11 but instead extend from a line 14 at a point of maximum distance from the axis to a line 15 at a minimum distance from the axis. The lines 14 and 15 define the edges of intermediate walls 16 which separate the cam surfaces 13.

An elongated expander 20 is received within the opening 12 in the shell 11. The expander 20 is provided with a series of cam surfaces 21 which cooperate with the cam surfaces 13 of the shell 11. Specifically, each of the cam surfaces 20 extends from a line 22 at a maximum distance from the longitudinal axis of the expander 20 to a line 23 at a minimum distance from the axis. Again, the lines 22 and 23 define the edges of a series of intermediate walls 24 which separate the series of cam surfaces 21.

Referring to FIG. 3, when the expander 20 is inserted in a shell 11, there is significant clearance between the cam surfaces 13 and 21. The expander 20 can be rotated within the shell 11 to cause the cam surfaces 21 of the expander 20 to engage those of the shell 11 and force the shell 11 outwardly at the four points of engagement to engage the test specimen 10. To this end, the expander 20 is formed of a material which is harder than that of the shell 11, such as a polyurethane of a greater hardness. The four points at which pressure is applied by the expanding shell 11 are disposed so as to coincide with the points of contact which the specimen 10 will have with an adjacent specimen.

Referring to FIGS. 1 and 2, a series of specimens 10 with holders are held together side-by-side in an array which simulates that to be found in a six-pack carrier. A retainer strap 30 is formed as an elongated member of sufficient length to overly three adjacent test specimens 10. There are three spaced projections 31 which extend downwardly from a bottom face of the strap 30 and each of the projections 31 are adapted to engage a recess 32 in the top surface of an expander 20. The projections 31 are elongated in the direction of the length of the strap 30. The recesses 32 are similarly elongated and oriented with respect to the cam surfaces 21 of the expander 20 such that the recesses 32 of adjacent holders will be aligned when the expanders 20 have been rotated to their proper positions (see FIG. 2) relative to the shells 11. The projections 31 are received in the recesses 32 of the adjacent holders and hold the test specimens together in a manner similar to what would be accomplished by a six-pack carrier of common design known as a high top carrier.

In the particular equipment for which the test specimen holders are designed to be used, two series of three test specimens held together by separate straps 30 will be held for and aft of the unit so as to provide a six-pack simulation. However, adjacent straps 30 could be joined together to hold six test specimens together with a single unit.

Although the embodiment of FIGS. 1-3 is shown as having four points of application of pressure, any larger or smaller number of points is possible, and the embodiment can be designed to coincide with the number of points of contact in the array of specimens to be tested.

Figure 4:
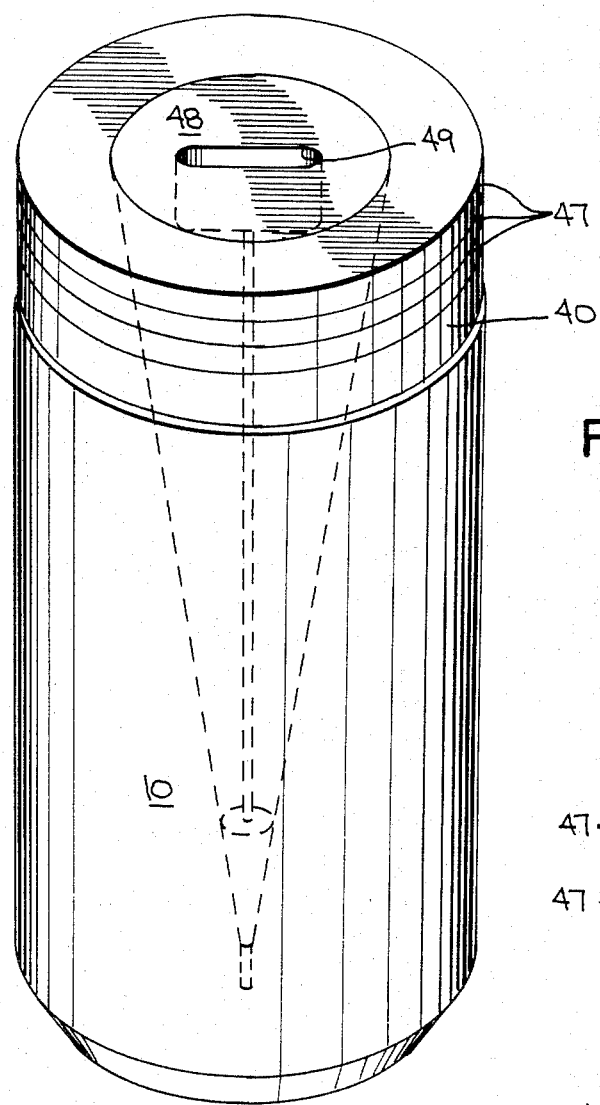
FIG. 4 is a view in perspective of a second embodiment of a holder of the present invention.
Figure 5:
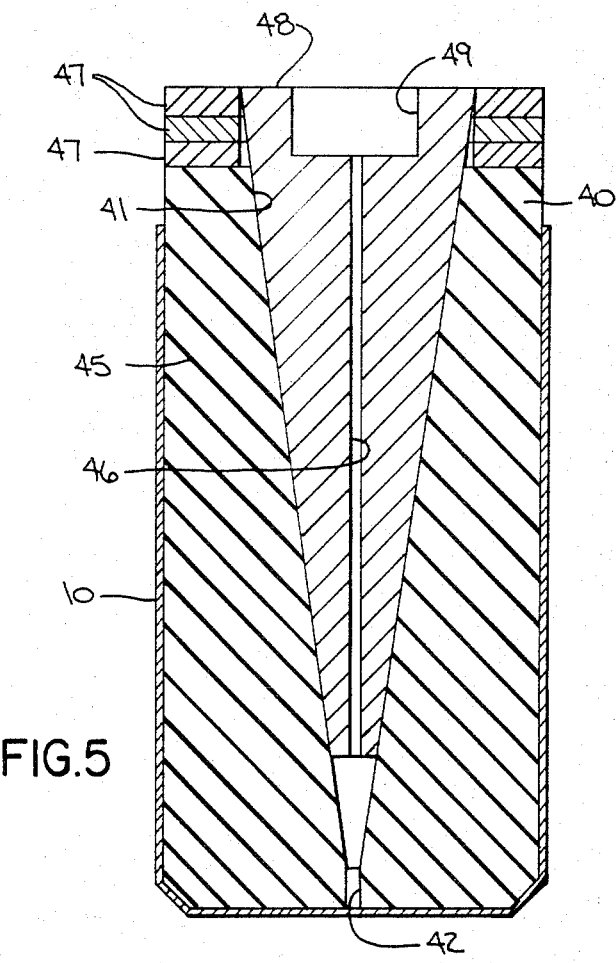
FIG. 5 is a view in vertical section of the holder of FIG. 4.

Referring to FIGS. 4 and 5, an alternate embodiment of the holder includes a shell 40 which is also preferably formed of a polyurethane of the same hardness as that of the shell 11 of the first embodiment. The shell 40 has a central opening 41 in the shape of an inverted cone and an air hole 42 extends from the bottom of the opening 41 to the bottom of the shell 40. Again, the shell 40 in its relaxed condition is sized so as to clear the inner perimeter of the test specimen 10 by about 1 mm. A conical expander 45 of material which is harder than that of the shell 40 is adapted to be inserted in and mate with the conical opening 41 of the shell 40. The expander 45 has a longitudinal air passage 46.

As the expander 45 is forced into the conical opening 41 in the shell 40 it will expand the shell 40 into engagement with the test specimen 10 thereby simulating the pressure exerted by the contents of a filled beverage can. The degree to which it is forced into the shell 40 can be controlled by adding or subtracting a series of disc-like washers 47 which rest on the top of the shell 40. The expander 45 is forced into the shell 40 until its top surface 48 is flush with the top most washer 47. The greater the number of washers 47 the less will be the expansion of the shell 40.

The conical expander 45 is provided with an elongated central recess 49 which can receive a projection 31 of the strap 30 to join together several of the holders with their test specimens to simulate a six-pack of cans.

In the embodiment of FIGS. 4 and 5, the slope of the conical opening 41 need not be as severe as that illustrated and the opening 41 can extend for the full length of the shell 40 thereby making a separate air hole 42 unnecessary. Also, plugs of different heights can be inserted at the bottom of the opening 41 to control the degree of insertion of the expander 45 instead of using the washers 47.

While the invention has been shown and used with empty cans, any circular cylindrical test specimen can be held for abrasion testing, including those which lack a bottom.

I claim:

1. A holder for thin walled circular cylindrical test specimens, comprising:
    a thick walled circular cylindrical shell of resilient material for insertion into the specimen, said shell having a continuous outer surface the diameter of which is only slightly less than the inner diameter of the test specimen for which it is intended and said shell substantially filling said specimen,
    said shell having an axially extending opening at its center that extends the full length of said shell; and
    an expander disposed in said opening and adapted to be moved relative to the shell to expand the shell along its full length into engagement with the inside of the specimen;
    a portion of said opening in said shell being defined by a plurality of axially extending and peripherally spaced cam surfaces and said expander having a like number of complementary cam surfaces that are brought into engagement with the cam surfaces of said shell as said expander is rotated about its axis.

2. A holder kit having component parts capable of being assembled to hold a plurality of empty open top cans for testing, comprising:
    a plurality of identical thick walled circular cylindrical shells of resilient material each adapted for insertion into a can;
    each shell being of a size to substantially fill a can and having an axially extending opening at its center than extends the full length of said shell;
    an expander for each shell, each expander disposed in the opening of a shell along the length of said shell and adapted to be moved relative to the shell to expand the shell along its full length into engagement with the inside of the can;
    each expander having a recess in its upper end that is elongated in a direction transverse to the axis of said expander; and
    a removable retainer strap including a plurality of depending projections each elongated along the length of said retainer strap and each projection adapted to releasably engage a recess in one of said expanders to hold together the plurality of shells, expanders and cans and to prevent rotation of the expanders relative to the strap.

3. A kit in accordance with claim 2 wherein a portion of the opening of each shell is defined by a plurality of axially extending cam surfaces and each expander has a like number of complementary cam surfaces which are brought into engagement with the cam surfaces of the respective shell as the expander is rotated about its axis, the recesses of the expanders being indentically oriented with respect to the cam surfaces of said expanders, and the recesses of the expanders being identically oriented with respect to projections of said retainer strap when the expanders have all been rotated sufficient to expand the shells into engagement with the insides of the cans.

* * * * *

UNITED STATES PATENT AND TRADEMARK OFFICE
CERTIFICATE OF CORRECTION

PATENT NO. : 4,529,184

DATED : July 16, 1985

INVENTOR(S) : Gaston A. Vandermeerssche

It is certified that error appears in the above-identified patent and that said Letters Patent is hereby corrected as shown below:

Column 3, line 5, "overly" should be --overlie--.

Column 4, line 38, "than" should be --that--.

Signed and Sealed this

Twenty-second Day of October 1985

[SEAL]

Attest:

DONALD J. QUIGG

Attesting Officer

Commissioner of Patents and Trademarks—Designate